F. M. MOONEY.
PROCESS FOR THE CONVERSION OF CHROMATE AND BICHROMATE OF SODIUM OR POTASSIUM TO CHROMIC SULFATE.
APPLICATION FILED MAY 22, 1920.
1,379,578. Patented May 24, 1921.
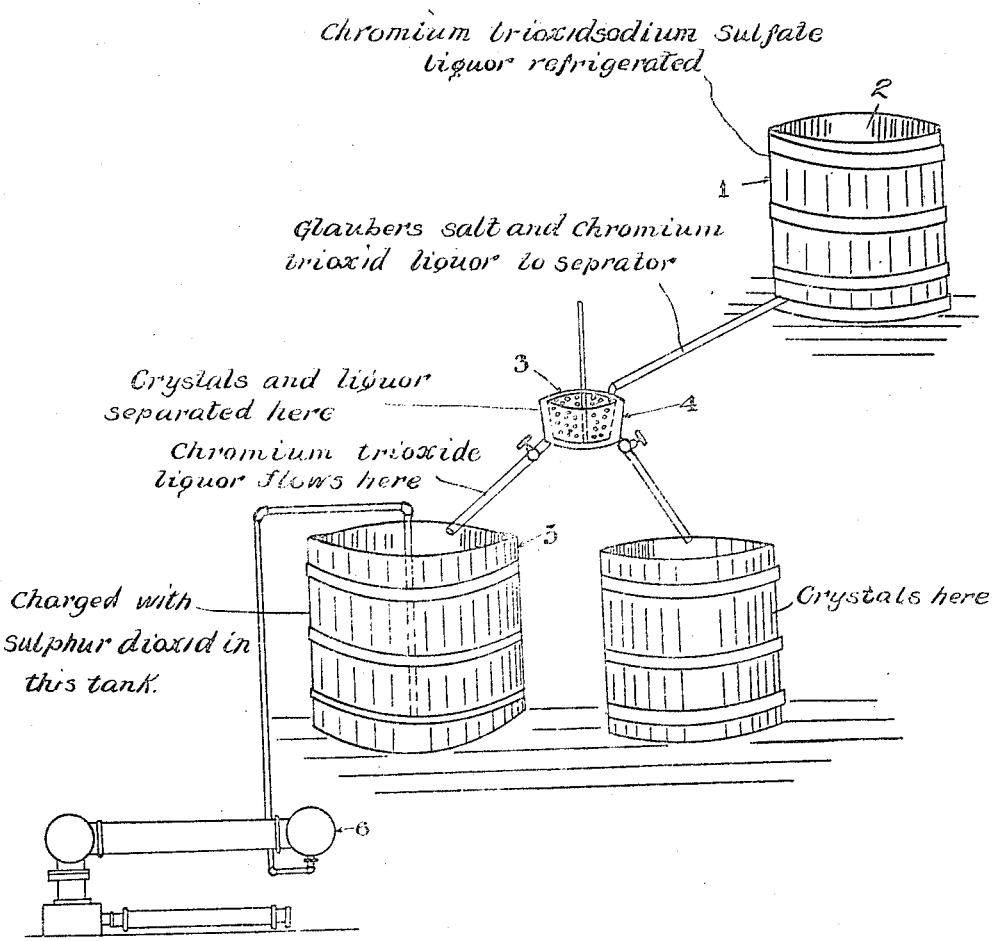

UNITED STATES PATENT OFFICE.

FRANK MELBOURNE MOONEY, OF MONTREAL, QUEBEC, CANADA, ASSIGNOR TO FORMATION SYNDICATE, OF MONTREAL, CANADA.

PROCESS FOR THE CONVERSION OF CHROMATE AND BICHROMATE OF SODIUM OR POTASSIUM TO CHROMIC SULFATE.

1,379,578.

Specification of Letters Patent. Patented May 24, 1921.

Application filed May 22, 1920. Serial No. 383,599.

*To all whom it may concern:*

Be it known that I, FRANK MELBOURNE MOONEY, a subject of the King of Great Britain, and residing at 17 Sussex avenue, in the city and district of Montreal, in the Province of Quebec, in the Dominion of Canada, have invented a new and useful Process for the Conversion of Chromate and Bichromate of Sodium or Potassium to Chromic Sulfate, of which the following is the specification.

The invention relates to a process for the conversion of bichromate or chromate of potassium or sodium to chromic sulfate, as more particularly described hereafter and pointed out in the claims for novelty.

The invention consists in the novel steps taken toward the union of known chemical substances, whereby with the aid of physical action the result is brought about, as specially set forth by equation in the following description in detail.

The objects of the invention are to eliminate certain chemical substances used in many known processes of conversion, and to economize in the material utilized to obtain the chromic sulphate in the purest form. By separating sodium salts, which tend to remove gelatin from hides, the chromic sulfate solution is thus better adapted for use in tanning. Additional objects are to facilitate the manufacture concerned in the use of the substance by producing a richer and more effective article as the result of the treatment; and generally to provide a liquor free from deleterious influences in its actions on the fiber of the leather and comparatively cheap to make.

In the manufacture of the product the chromate or bichromate of potassium and sodium are first changed to chromium trioxid in the well known or approved manner by the use of sulfuric or other acids and then by a refrigeration step the temperature is lowered to 0° F. till the sulfates formed become crystallized.

At this stage the trioxid of chromium solution is drained off through an extractor and by centrifugal operation the crystallized sodium salts are freed from the adhering chromium trioxid, and the latter is run into a separate tank where it is treated with sulfur dioxid generated by burning sulfur in a suitable plant.

The liquor is thus converted forming chromic sulfate thereby finishing the process of its production.

The crystals of sodium sulfate are removed from the machine by dissolving them in water and draining off the solution.

The preferable method employed is to have a tank of considerable size, which contains the trioxid that has been previously prepared by means of the action of sulfuric acid on the bichromate or chromate of sodium or potassium. This tank indicated by the numeral 1 in the accompanying diagrammatic drawing is associated with a refrigerating device 2, that so influences the solution, as to crystallize the sodium salts.

The crystallized sodium salts and liquor flow to the extractor 3, which is contained within the casing 4 and rapidly rotated therein and as the extractor 3 is of screen form, the liquor leaves the sodium salts through centrifugal force due to the rapid rotation and flows to the tank 5. The sulfur burning plant 6 is connected to the tank 5 and the gas from said plant is directed into and thoroughly saturates the solution, which converts the chromium trioxid to chromium sulfate.

For those versed in the art, the following equation represents the final chemical action:—

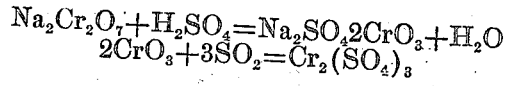

$$Na_2Cr_2O_7 + H_2SO_4 = Na_2SO_4 2CrO_3 + H_2O$$
$$2CrO_3 + 3SO_2 = Cr_2(SO_4)_3$$

It must be understood that some changes may be made without departing from the spirit of the invention.

What I claim is:—

1. The process of making chromic sulfate comprising the freeing by refrigeration of a solution of chrominum trioxid from Glauber's salt, the drawing off of the liquor containing chromium oxid and the charging of the said liquor with a reducing sulfur-containing gas.

2. The process of making chromic sulfate comprising the subjecting of a solution of chromium trioxid and Glauber's salt to a lowered temperature of approximately zero Fahr., and thereby crystallizing the salt, the withdrawal of both liquor and salt for separation, the separation of the liquor and the discharge of same to its receptacle and the charging of the said liquor with a reducing sulfur-containing gas.

3. The process of making chromic sulfate comprising the refrigeration of a solution of chromium trioxid and Glauber's salt to bring about the crystallization of the salt, the separation of the liquid from the salt by centrifugal action, the charging of the liquor with a reducing sulfur-containing gas and the withdrawal of the salt to a separate receptacle by dissolving the same.

Signed at the city of Montreal, Quebec, Canada, this 19th day of May 1920.

FRANK MELBOURNE MOONEY.